US009075506B1

(12) United States Patent
Uchida et al.

(10) Patent No.: US 9,075,506 B1
(45) Date of Patent: Jul. 7, 2015

(54) REAL-TIME ANALYSIS OF FEATURE RELATIONSHIPS FOR INTERACTIVE NETWORKS

(71) Applicant: Google Inc., Mountain View, CA (US)

(72) Inventors: Makoto Uchida, Mountain View, CA (US); David Andrew Huffaker, Palo Alto, CA (US); Abhijit Bose, Paramus, NJ (US)

(73) Assignee: Google Inc., Mountain View, CA (US)

( * ) Notice: Subject to any disclaimer, the term of this patent is extended or adjusted under 35 U.S.C. 154(b) by 366 days.

(21) Appl. No.: 13/653,338

(22) Filed: Oct. 16, 2012

(51) Int. Cl.
*G06F 17/50* (2006.01)
*G06F 3/0482* (2013.01)
*G06F 11/34* (2006.01)
*G06F 21/12* (2013.01)

(52) U.S. Cl.
CPC ............. *G06F 3/0482* (2013.01); *G06F 11/34* (2013.01); *G06F 21/128* (2013.01)

(58) Field of Classification Search
CPC .................................................. G06F 3/0482
USPC ........... 703/13; 715/738, 753, 811, 201, 720; 725/9; 705/14.23, 39, 7.11, 14.41, 705/26.7, 7, 7.29, 14.66, 14.49; 707/769; 726/1; 706/52; 345/745; 455/456.1; 463/42
See application file for complete search history.

(56) References Cited

U.S. PATENT DOCUMENTS

| | | | |
|---|---|---|---|
| 5,823,879 A * | 10/1998 | Goldberg et al. ............... 463/42 |
| 7,594,189 B1 * | 9/2009 | Walker et al. .................. 715/811 |
| 8,429,012 B2 * | 4/2013 | Wright et al. ............... 705/14.41 |
| 8,655,695 B1 * | 2/2014 | Qu et al. ....................... 705/7.11 |
| 2003/0030666 A1 * | 2/2003 | Najmi et al. ................... 345/745 |
| 2004/0064351 A1 * | 4/2004 | Mikurak ............................ 705/7 |
| 2006/0053380 A1 * | 3/2006 | Spataro et al. ................. 715/753 |
| 2007/0287473 A1 * | 12/2007 | Dupray ....................... 455/456.1 |
| 2009/0254971 A1 * | 10/2009 | Herz et al. ......................... 726/1 |
| 2011/0047072 A1 * | 2/2011 | Ciurea ............................. 705/39 |
| 2011/0218045 A1 | 9/2011 | Williams et al. |
| 2011/0231224 A1 * | 9/2011 | Winters ....................... 705/7.29 |
| 2012/0078838 A1 | 3/2012 | Kaufman |
| 2013/0054708 A1 | 2/2013 | Bhatt et al. |
| 2013/0073382 A1 * | 3/2013 | Henkin et al. ............. 705/14.49 |
| 2014/0006129 A1 * | 1/2014 | Heath ......................... 705/14.23 |
| 2014/0052540 A1 * | 2/2014 | Rajaram et al. ............ 705/14.66 |

(Continued)

OTHER PUBLICATIONS

Furukawa, et al., "Users' Behavioral Analysis on Weblogs," AAAI Spring Symposium: Compuational Approaches to Analyzing Weblogs, 2006, pp. 34-36.

(Continued)

*Primary Examiner* — Kandasamy Thangavelu
(74) *Attorney, Agent, or Firm* — McDermott Will & Emery LLP

(57) ABSTRACT

Systems and methods for providing real-time analysis of feature relationships are provided. In some aspects, a method includes receiving user activity data and user status data for users in the interactive network, the interactive network comprising at least two user features; generating a user dataset by associating, for each user, the user's activity data with the user's status data using a unique identification of the user and a timestamp; analyzing the user dataset using a statistical model; and providing, for display, an output of the analysis by the statistical model, the output including an indicator of a relationship between a use of one of the two user features with a use of the other of the two user features.

18 Claims, 6 Drawing Sheets

(56) References Cited

U.S. PATENT DOCUMENTS

2014/0074649 A1* 3/2014 Patel et al. .................. 705/26.7
2014/0129942 A1* 5/2014 Rathod ........................ 715/720

OTHER PUBLICATIONS

Stata Data Analysis Examples. UCLA: Institute for Digital Research and Education—Via Wayback Internet Archive Sep. 26, 2011. <Http://www.ats.ucla.edu/stat/stata/dae/logit.htm>.

Schler, et al., "Effects of Age and Gender on Blogging," AAAI Spring Symposium: Computational Approaches to Analyzing Weblogs, 2006, vol. 6, pp. 199-205.

Teng, et al., "Detection of Bloggers' Interests: Using Textual, Temporal, and Interactive Features," Proceedings of the 2006 IEEE/WIC/ACM International Conference on Web Intelligence, 2006.

Nagy, et al., "User Behaviour Analysis Based on Time Spent on Web Pages," Web Mining Applications in E-commerce and E-services, Springer Berlin Heidelberg, 2009, pp. 117-136.

U.S. Appl. No. 13/653,341, filed Oct. 16, 2012.

* cited by examiner

REAL-TIME ANALYSIS OF FEATURE RELATIONSHIPS FOR INTERACTIVE NETWORKS

BACKGROUND

The subject technology generally relates to social networking.

Interactive networks, such as e-commerce web sites and online social networks, rely on user engagement with the interactive networks for determining how to better provide services to users.

SUMMARY

The disclosed subject matter relates to a machine-implemented method for determining a relationship between the use of features on an interactive network. The method includes receiving user activity data and user status data for users in the interactive network, the interactive network comprising at least two user features; generating a user dataset by associating, for each user, the user's activity data with the user's status data using a unique identification of the user and a timestamp; analyzing the user dataset using a statistical model; and providing, for display, an output of the analysis by the statistical model, the output including an indicator of a relationship between a use of one of the two user features with a use of the other of the two user features.

The disclosed subject matter relates to a non-transitory computer-readable medium that includes instructions. The instructions include code for receiving user activity data and user status data for users in the interactive network, the interactive network comprising at least two user features; generating a user dataset by associating, for each user, the user's activity data with the user's status data using a unique identification of the user and a timestamp; analyzing the user dataset using a statistical model; and providing, for display, an output of analysis by the statistical model, the output including an indicator of a relationship between a use of one of the two user features with a use of the other of the two user features.

The disclosed subject matter relates to a system that includes a computer. The computer is configured to receive user activity data and user status data for users in the interactive network, the interactive network comprising at least two user features; define at least one user metric for turning the user activity data and user status data into at least one user metric; generate a user dataset for each user, based on the user activity data, the user status data and the at least one user metric; analyze the user dataset using a statistical model; and provide, for display, an output of the analysis by the statistical model, the output including an indicator of a relationship between a use of one of the two user features with a use of the other of the two user features.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to a scalable solution for analyzing interactive network data to assess how the use of certain features of the interactive network is related to the use of other features of the interactive network. The system logs user activity data (e.g., both interactions between users and direct activities with the network, such as posts) and user status data (e.g., the status of a user's account at a certain time), and then transforms the user activity data and user status data into a user dataset for analysis by an appropriate statistical model. The statistical model outputs an analysis of the user dataset. The output provides a relationship between feature use on the interactive network, including how the use of one feature impacts the use of another feature. For example, an analysis by a linear mixed effect model of a user dataset from an online social network indicates that users who read items from an information feed post, on average, 20% more items than users that do not read items from an information feed.

Figure 1:
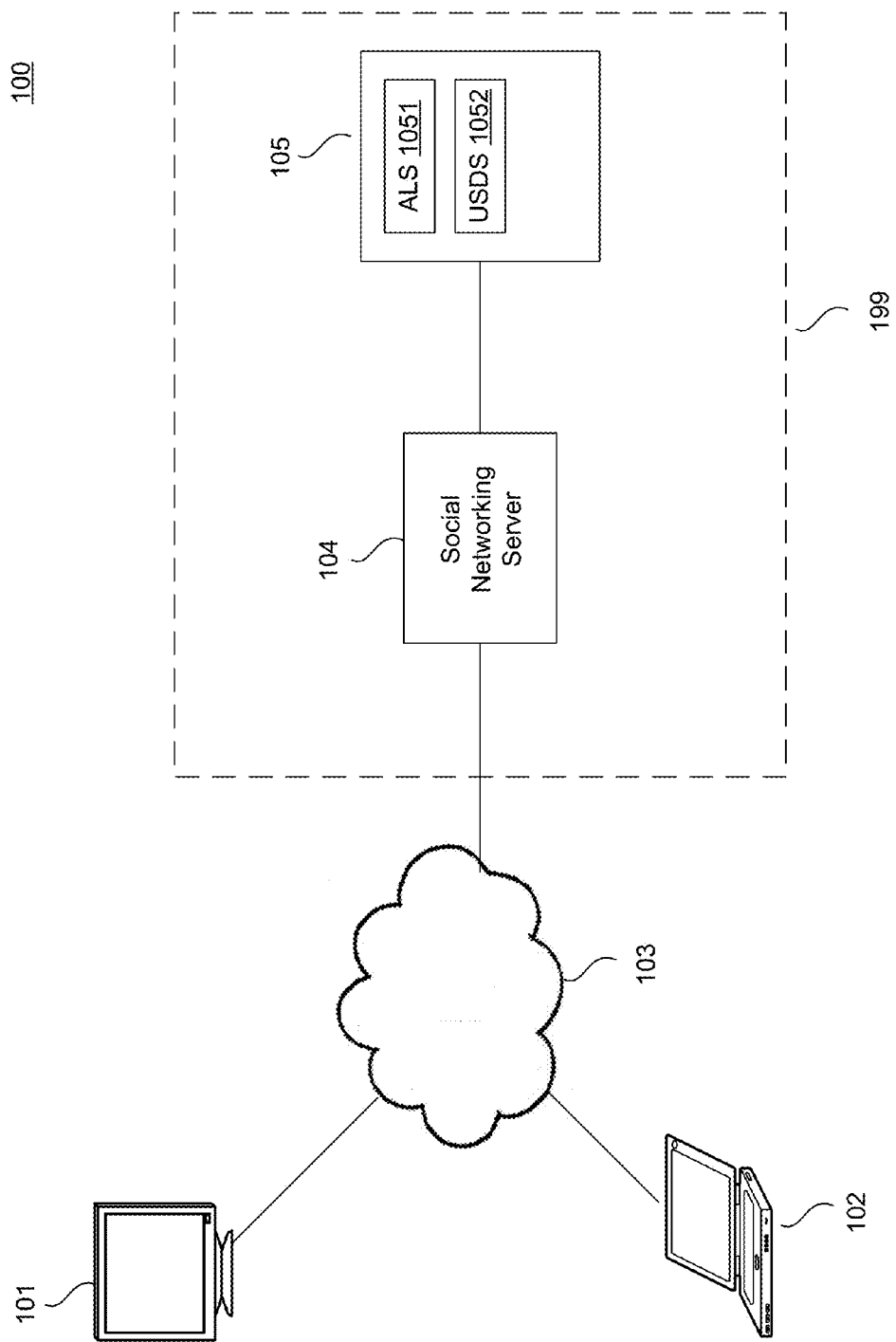
FIG. 1 illustrates a block diagram of an example system 100 for providing real-time analysis of feature relationships.

FIG. 1 illustrates a block diagram of an example system 100 for providing real-time analysis of feature relationships. As shown, the system 100 may have a plurality of user devices (e.g., user devices 101 and 102) coupled to a social networking system 199 via a network 103. The social networking system 199 may have a server 104 and a storage device 105.

A user may interact with the social networking system 199 from a user device, e.g., the user device 101 or 102. The server 104 may log user activity data (e.g., both interactions between users and direct activities with the network, such as posts) and user status data (e.g., the status of a user's account at a certain time), and then transforms the user activity data and user status data into a user dataset for analysis by an appropriate statistical model.

The network 103 may be, e.g., the Internet, an intranet, a local area network, a cellular network or other communication networks.

The storage device 105 may be any commercially available storage device. The storage device 105 may have a user activity logs storage (ALS) 1051 for storing user activity data (e.g., both interactions and direct activities with the network, such as posts), and a user status data storage (USDS)

1052 for storing user status data (e.g., the status of a user's account at a certain time). The storage device 105 may also store user metrics.

Figure 2:
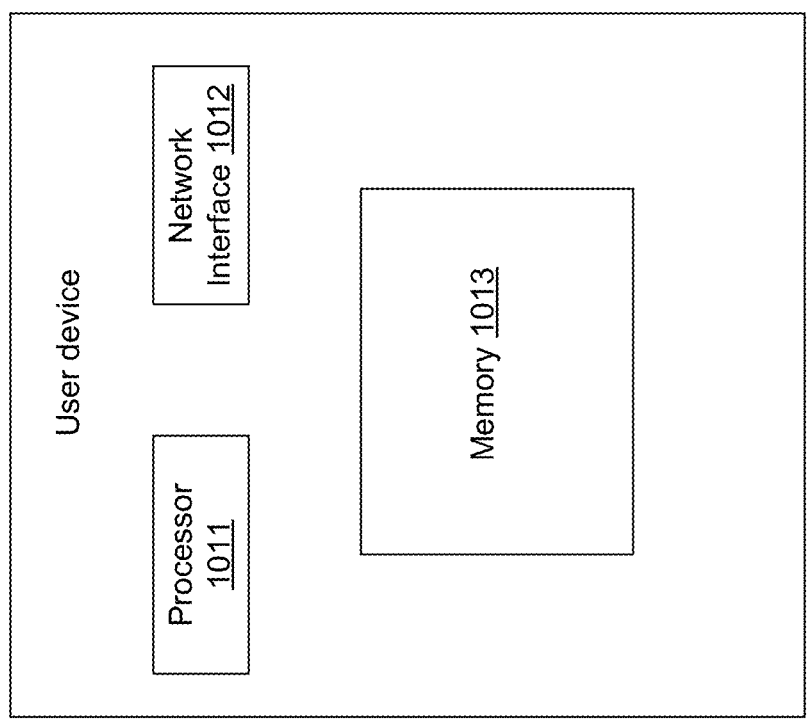
FIG. 2 illustrates a block diagram of an example of a user device shown in FIG. 1.

FIG. 2 illustrates a block diagram of an example of a user device shown in FIG. 1. As shown, a user device, 101 or 102, may include a processor 1011, a network interface 1012 and a memory 1013. The processor 1011 is configured to execute computer instructions that are stored in a computer-readable medium, for example, the memory 1013. The processor 1011 may be a central processing unit (CPU). The network interface 1012 is configured to allow the user device to transmit and receive data in the network 103. The network interface 1012 may include one or more network interface cards (NICs). The memory 1013 stores data and instructions. With the user device, the user may change his social graph, create new circles which are groups of socially interconnected people (e.g., where the groups are selected by a user), add a member to a circle, post, respond to or share comments, approve or remove tags, or use any other functions provided by the social network.

The user device 101 and 102 may be any computing device capable of displaying content, for example, via a web browser or via a specialized application. The user device 101 and 102 may be a laptop computer, a desktop computer, a mobile phone, a personal digital assistant (PDA), a tablet computer, a netbook, a physical machine or a virtual machine. Persons skilled in the art will recognize other devices that could implement the functionalities of the user device 101 and 102.

Figure 3:
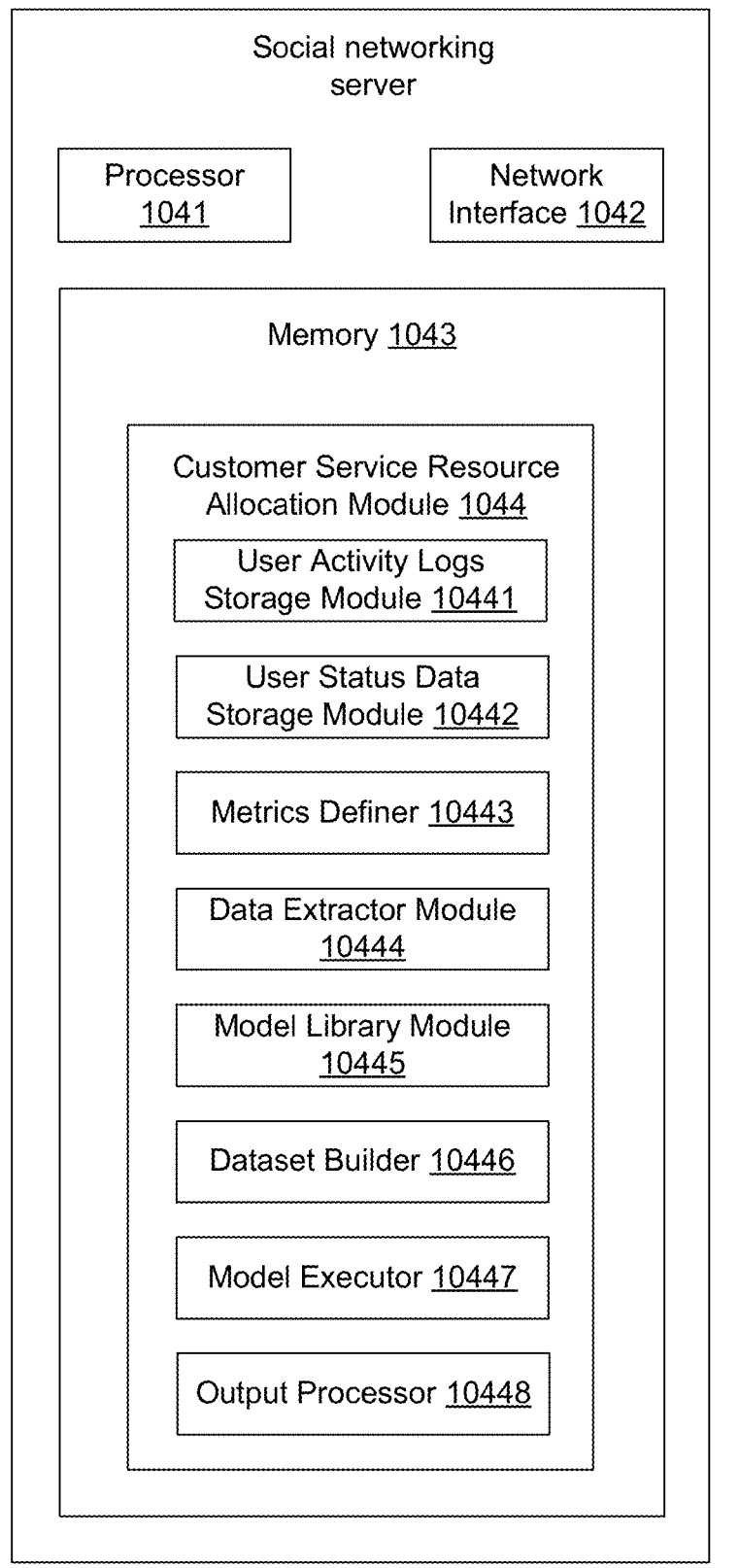
FIG. 3 illustrates a block diagram of an example of a social networking server 104 shown in FIG. 1.

FIG. 3 illustrates a block diagram of an example of a social networking server 104 shown in FIG. 1. As shown, the social networking server 104 may include a processor 1041, a network interface 1042 and a memory 1043. The processor 1041 is configured to execute computer instructions that are stored in a computer-readable medium, for example, the memory 1043. The processor 1041 may be a central processing unit (CPU). The network interface 1042 is configured to allow the social networking server 104 to transmit and receive data in the network 103. The network interface 1042 may include one or more network interface cards (NICs). The memory 1043 stores data and instructions.

The memory 1043 may store a feature relationship analysis module 1044. As shown, the feature relationship analysis module 1044 may include a user activity logs storage (ALS) module 10441, a user status data storage (USDS) module 10442, a metrics definer (MD) 10443, a data extractor (DE) module 10444, a model library (ML) module 10445, a dataset builder 10446, a model executor 10447, and an output processor (OP) 10448.

The user activity logs storage (ALS) module 10441 may define and log a user's activities and store them in the ALS 1051 in the storage device 105. In some implementations, the user's activities in a certain time window, e.g., 24 hours, may be defined, logged and stored. In some implementations, the user activities that are necessary in subsequent processes may be defined, logged and stored. In one example, the following user activities may be logged, with timestamps and user information:

1) User's activities, e.g., sharing a post, uploading a photo, playing a game or reading a post; and/or
2) User's interactions, e.g., commenting on another user's post, mentioning another user in a post, or tagging a user in an uploaded photo.

In some implementations, the user activity logs storage module 10441 may log the above activities by further dimension breakdowns. In one example, the further dimension breakdown may be a sub-component of the social networking product, e.g., stream, profile, photos, sparks or games. In one example, the further dimension breakdown may be an access point of the social networking product, e.g., PC web, or mobile client. In one example, the further dimension breakdown may be privacy setting of the activity, e.g., visibility, or access control list.

Consequently, for every period (e.g., every 24 hour period), a stream of user activities, keyed by the user's identity information and sorted by timestamps of activity events, may be stored.

The user status data storage (USDS) module 10442 may define the user's status data and store it in the USDS 1052 in the storage device 105. In some implementations, user's status data that is needed in subsequent processes may be defined and stored. Unlike the user activity data, user status data doesn't have the time window. Instead, it may have a snapshot timestamp where the information is "as of". Some user status data may never be changed, while some may change over time. For example, the following user status data may be stored:

1) Social graph information, e.g., the number of circles and their creation timestamps, members in each circle, circle names and visibility settings; and/or
2) Demographic metadata information, e.g., age, gender, country, language, and the signup timestamp.

Consequently, a series of snapshots of user status data, keyed by the user's identity information and snapshot timestamps, may be generated and stored.

The metrics definer (MD) 10443 may define how to turn user activity data and user status data into user metrics, which are extracted and computed by the DE module 10444. Examples of activity metrics may be, e.g., a number of items posted in 24 hours, a number of unique users who commented on the user's post in 24 hours, a number of comments received on the user's post in 24 hours, a number of other users' posts the user read on Stream in 24 hours, a number of other users' posts the user commented on from a mobile client in 24 hours, and the time spent on the social networking product in 24 hours. Examples of status metrics may be, e.g., a number of distinct members in the user's circles, a number of circles that have at least one member, and the gender of the user.

Some of the metrics may be stored in the ALS 1051 or USDS 1052, while some may need further computation over what is stored in the ALS 1051 or USDS 1052. The user metrics may be extracted and computed by the data extractor (DE) module 10444.

The data extractor (DE) module 10444 may extract data from ALS 1051 and/or USDS 1052 and join the data by user identity information and timestamps. In some implementations, the data extractor (DE) module 10444 may be implemented by a programmable language, so as to dynamically specify which particular user activity data and/or user status data needs to be extracted, and for what analysis time window. Since data in the ALS 1051 is chucked into a 24 hour time window, while data in the USDS 1052 doesn't have the time window but has snapshot timestamps, the data extractor (DE) module 10444 may perform timestamp matching to choose the nearest 24 hour window and snapshot to do the correct joining.

Consequently, the data extractor (DE) module 10444 may generate a bulk dataset keyed by the user identity information and timestamps, as follows:

{user_id, timestamp, ma1, ma2, ma3, . . . , ms1, ms2, ms3, ms4, ms5}
1001, 2011-08-10, 0, 3, 1, . . . , 2, 3, 4, male, US, . . .
1002, 2011-08-11, 2, 3, 1, . . . , 3, 3, 5, male, US, . . .
1003, 2011-08-10, 4, 60, 2, . . . , 0, 0, 1, female, UK, . . .

wherein maX is an activity metric, and msX is a status metric, which are defined by the metrics definer (MD) 10443.

The model library (ML) module 10445 may define a statistical model specification. At least one statistical model that may be applied to the user dataset to get an estimate on future engagement may be defined. In some implementations, the model library (ML) module 10445 may include a mixed-effect model, a propensity score matching model, etc.

The dataset builder 10446 may pre-process the data extracted by the data extractor (DE) module 10444 according to a statistical model specification defined by the model library (ML) 10445. In some implementations, some models can handle Boolean variables, so the dataset builder 10446 may apply a certain threshold to turn variables into Boolean.

The dataset builder 10446 may generate a set of independent variables and dependent variable(s) to measure the impact of the at least one statistical model to be applied according to the statistical model specification.

The dataset builder 10446 may perform data cleaning to exclude outliers and remove highly correlated independent variables. In one example, if the uplift on the number of items posted is to be estimated, the dataset may be as follows.

{user_id, timestamp, # of posts, ma1, ma2, ma3, . . . , ms1, ms2, ms3, . . . }

1001, 2011-08-10, 10, false, true, true, . . . , true, true, true, . . .

1002, 2011-08-10, 2, true, true, true, . . . , false, false, true, . . .

1003, 2011-08-10, 4, true, true, true, . . . , true, true, true, . . .

where maX is the activity metric, and msX is the status metric, which may be defined by the metrics definer (MD) 10443.

The model executor 10447 may run the at least one statistical model that is defined by the model library (ML) module 10445, and choose the 'best fit' model and model parameters. For example, when running the propensity score matching model, if propensity score matching is applied to estimate uplift of the number of items posted regarding other metrics, an example output may be as follows:

| Metric | Baseline | Uplift | % in population |
| --- | --- | --- | --- |
| has >10 friend in circles | 10 | +14% | 20% |
| male | 40 | +20% | 70% |
| read 10> items on Stream | 3 | +5% | 70% |
| received >3 comments | 5 | +50% | 5% |
| posted >3 items from mobile | no significant uplift | | |
| used games | no significant uplift | | |

Figure 5:
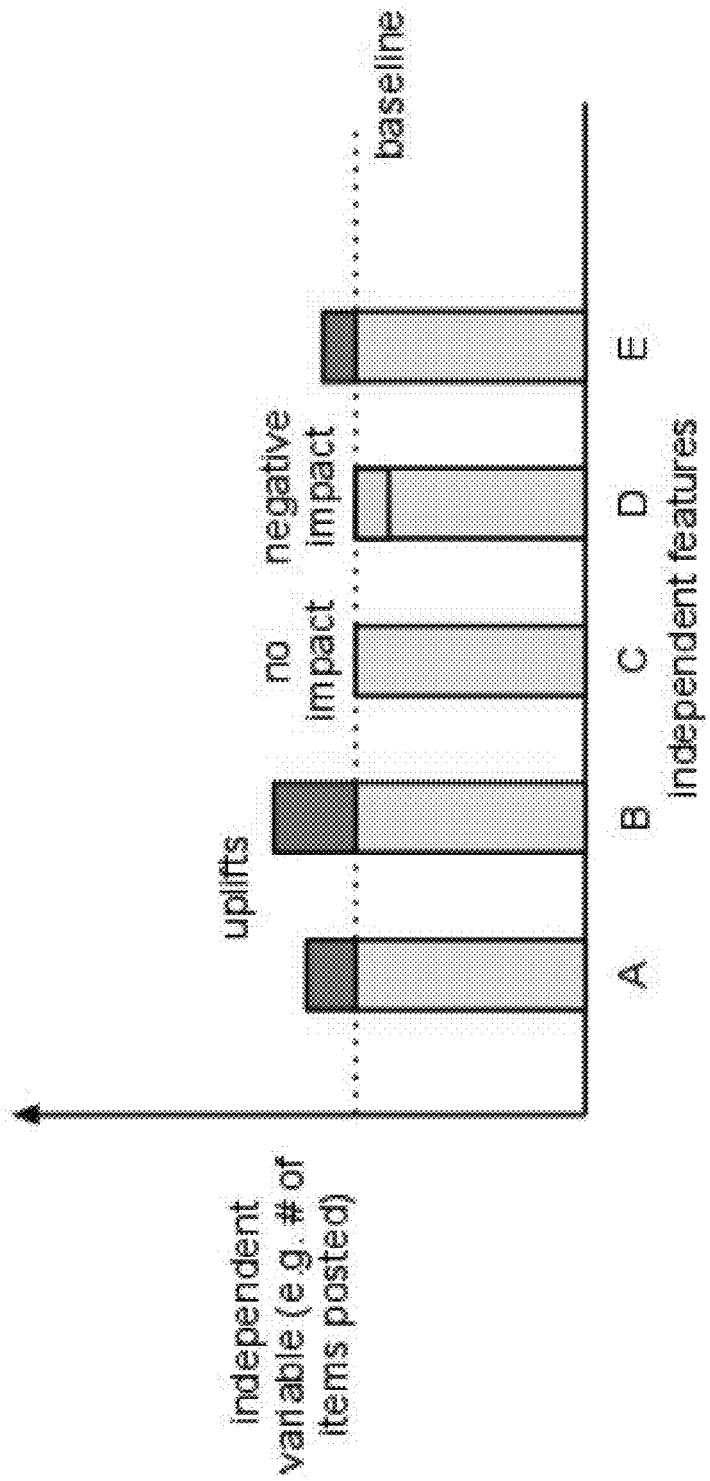
FIG. 5 illustrates an example of an output of uplift on features.

The output Processor (OP) 10448 may display the output of the model executor module 10447, and generate a report in human readable format. FIG. 5 illustrates an example of an output of uplift.

Based on the scenario described above, the input and output of the system may be as follows.

For a social network, where
a user 1001, a male user from US, who received comments, read other users' posts on stream, has circle members, has non-empty circles, was added to other users' circles, and posted 10 items on August 10;
a user 1002, who did not receive comments, did read other users' posts on stream, does not have circle members, does not have nonempty circles, was added to other users' circles, and posted 2 items on August 10; and
a user 1003, who did receive comments, did read other users' posts on stream, has circle members, has non-empty circles, was added to other users' circles, and posted 4 items on August 10.

According to the linear mixed effect model, uplift by receiving comments on number of posts is +15%, and uplift by having circle members on number of posts is +5%. According to the propensity score matching model, users who read items on Stream post +20% more items than those who didn't read items. The output may be used to identify key product features that encourage users to post more items. Also, the output may also be used to compute user 1002's estimated number of posts in the scenario where he has circle members versus the scenario where he received comments, and identify which feature would achieve bigger uplift on the particular user.

Figure 4:
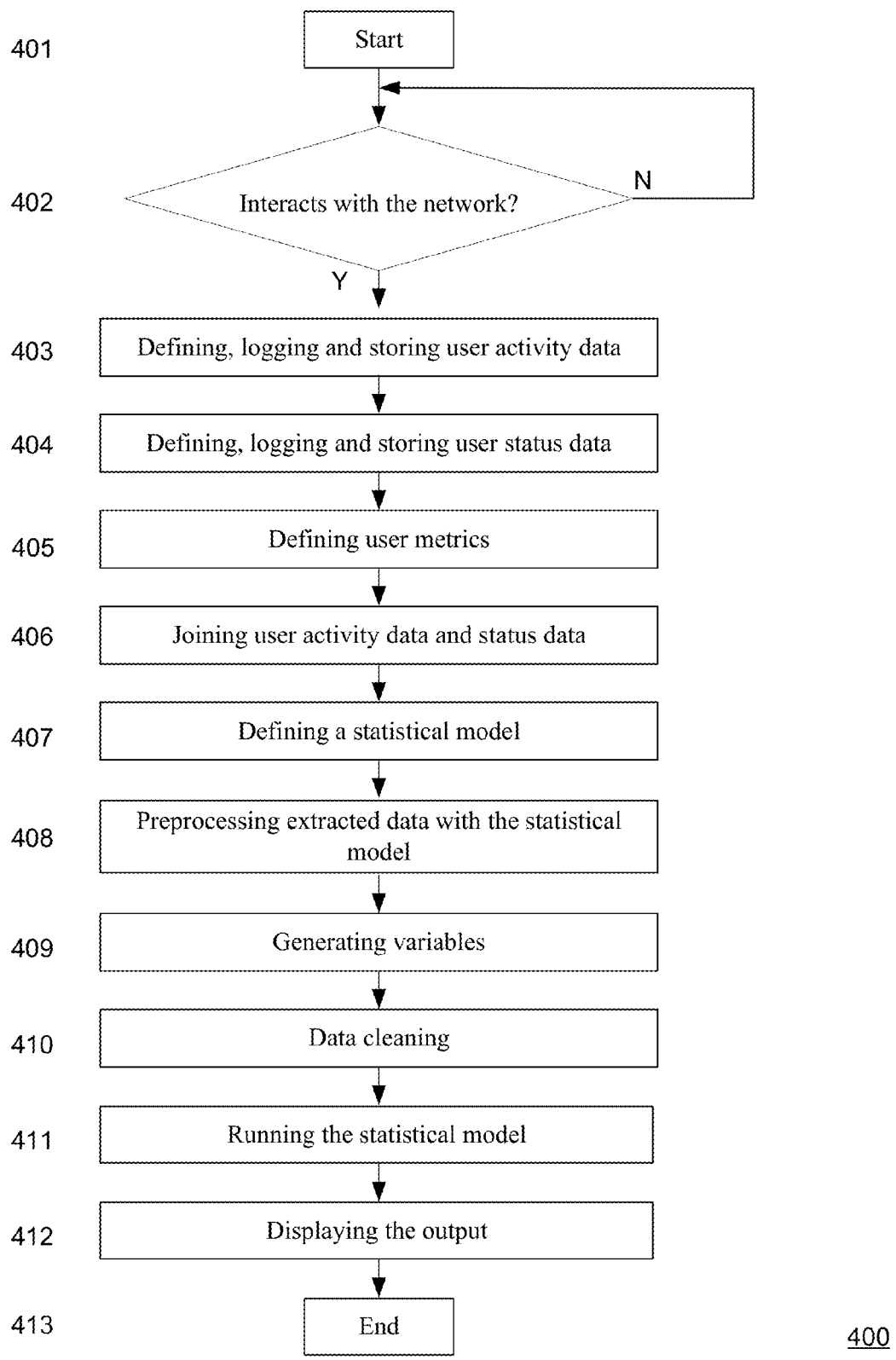
FIG. 4 illustrates a flowchart of an example of a method for analyzing feature relationships for interactive networks.

FIG. 4 illustrates a flowchart of an example of a method for analyzing feature relationships for interactive networks.

The process may start at 401.

At 402, it may be determined whether a user interacts with the social networking system 199. If not, 402 may be repeated.

If the user interacts with the social networking system 199, at 403, the user's activity may be defined, logged and stored, e.g., by the activity logs storage (ALS) module 10441 in the ALS 1051 in the storage device 105. In some implementations, the user's activities in a certain time window, e.g., 24 hours, may be defined, logged and stored. In some implementations, user activities that are necessary in subsequent processes may be defined, logged and stored. In one example, the following user activities may be logged, with timestamps and user information:

1) User's activities, e.g., sharing a post, uploading a photo, playing a game or reading a post; and/or
2) User's interactions, e.g., commenting on another user's post, mentioning another user in a post, or tagging a user in an uploaded photo.

In some implementations, the above activities may be logged by further dimension breakdowns. In one example, the further dimension breakdown may be a sub-component of the social networking product, e.g., stream, profile, photos, sparks or games. In one example, the further dimension breakdown may be an access point of the social networking product, e.g., PC web, or mobile client. In one example, the further dimension breakdown may be privacy setting of the activity, e.g., visibility, or access control list.

Consequently, for every 24 hour period, a stream of user activities, keyed by the user's identity information, and sorted by timestamp of activity events, may be stored.

At 404, the user's status data may be defined and stored, e.g., by the user status data storage (USDS) module 10442 in the USDS 1052 in the storage device 105. In some implementations, user's status data that is needed in subsequent processes may be defined and stored. Unlike the user activity data, user status data doesn't have the time window. Instead, it has a snapshot timestamp where the information is "as of". Some user status data will never be changed, while some may change over time. For example, the following user status data may be stored:

1) Social graph information, e.g., the number of circles and their creation timestamp, members in each circle, circle names and visibility settings; and/or
2) Demographic metadata information, e.g., age, gender, country, language, and the signup timestamp.

Consequently, a series of snapshots of user status data, keyed by the user's identity information and snapshot timestamps, may be generated and stored.

At 405, it may be defined how to turn user activity data and user status data into user metrics by the metrics definer (MD) 10443.

Examples of activity metrics may be, e.g., a number of items posted in 24 hours, a number of unique users who commented on the user's post in 24 hours, a number of comments received on the user's post in 24 hours, a number of other users' posts the user read on Stream in 24 hours, a number of other users' posts the user commented on from a mobile client in 24 hours, and the time spent on the social networking product in 24 hours.

Examples of status metrics may be, e.g., a number of distinct members in the user's circles, a number of circles that have at least one member, and the gender of the user. The user metrics may be extracted and computed by the data extractor (DE) module 10444.

At 406, data from ALS 1051 and USDS 1052 may be extracted and joined by user identity information and timestamps, e.g., by the data extractor (DE) module 10444. In some implementations, the data extractor (DE) module 10444 may be implemented by a programmable language, so as to dynamically specify which particular user activity data and/or user status data needs to be extracted, and for what analysis time window. Since data in the ALS 1051 is chucked into a 24 hour time window, while data in the USDS 1052 doesn't have the time window but has snapshot timestamps, the data extractor (DE) module 10444 may perform timestamp matching to choose the nearest 24 hour window and snapshot to do the correct joining.

Consequently, the data extractor (DE) module 10444 may generate a bulk dataset keyed by the user identity information and timestamps, as follows:

{user_id, timestamp, ma1, ma2, ma3, . . . , ms1, ms2, ms3, ms4, ms5 . . . }
1001, 2011-08-10, 0, 3, 1, . . . , 2, 3, 4, male, US, . . .
1002, 2011-08-11, 2, 3, 1, . . . , 3, 3, 5, male, US, . . .
1003, 2011-08-10, 4, 60, 2, . . . , 0, 0, 1, female, UK, . . .
wherein maX is an activity metric, and msX is a status metric, which are defined by the metrics definer (MD) 10443.

At 407, at least one statistical model that may be applied to the dataset to get an estimate on future engagement may be defined, e.g., by the model library (ML) module 10445. In some implementations, the model library (ML) module 10445 may include a mixed-effect model, a propensity score matching model, etc.

At 408, the data extracted by the data extractor (DE) module 10444 may be pre-processed according to a statistical model specification (e.g., defined by the model library (ML) module 10445) by e.g., the dataset builder 10446. In some implementations, some models can handle Boolean variables, so the dataset builder 10446 may apply a certain threshold to turn variables into Boolean.

At 409, a set of independent variables and dependent variable(s) which may be used to measure impact of the model to be applied may be generated by the dataset builder 10446 according to the statistical model specification.

At 410, data cleaning may be done by the dataset builder 10446 to exclude outliers and remove highly correlated independent variables. In one example, if the uplift on the number of items posted is to be estimated, the dataset may be as follows:

{user_id, timestamp, # of posts, ma1, ma2, ma3, . . . , ms1, ms2, ms3, . . . }
1001, 2011-08-10, 10, false, true, true, . . . , true, true, true, . . .
1002, 2011-08-10, 2, true, true, true, . . . , false, false, true, . . .
1003, 2011-08-10, 4, true, true, true, . . . , true, true, true, . . .

where maX is the activity metric, and msX is the status metric, which may be defined by the metrics definer (MD) 10443.

At 411, the model executor 10447 may run the at least one statistical model that is defined by the model library (ML) module 10445, and choose the 'best fit' model and model parameters. For example, when running the propensity score matching model, if propensity score matching is applied to estimate uplift of the number of items posted regarding other metrics, an example output may be as follows:

| Metric | Baseline | Uplift | % in population |
| --- | --- | --- | --- |
| has >10 friend in circles | 10 | +14% | 20% |
| male | 40 | +20% | 70% |
| read 10> items on Stream | 3 | +5% | 70% |
| received >3 comments | 5 | +50% | 5% |
| posted >3 items from mobile | | no significant uplift | |
| used games | | no significant uplift | |

At 412, the output processor (OP) 10448 may display the output of the model executor 10447, and generate a report in human readable format.

Based on the scenario described above, the input and output of the system may be as follows.

For a social network, where a user 1001, a male user from US, who received comments, read other users' posts on stream, has circle members, has non-empty circles, was added to other users' circles, and posted 10 items on August 10;

a user 1002, who did not receive comments, did read other users' posts on stream, does not have circle members, does not have nonempty circles, was added to other users' circles, and posted 2 items on August 10; and a user 1003, who did receive comments, did read other users' posts on stream, has circle members, has non-empty circles, was added to other users' circles, and posted 4 items on August 10.

According to the linear mixed effect model, uplift by receiving comments on number of posts is +15%, and uplift by having circle members on number of posts is +5%. According to the propensity score matching model, users who read items on Stream post +20% more items than those who didn't read items. This output may be used to identify key product features that encourage users to post more items. Also, this output may be used to compute user 1002's estimated number of posts in the scenario where he has circle members versus the scenario where he received comments, and identify which feature would achieve bigger uplift on the particular user.

The process may end at 413.

Although FIG. 4 is described with reference to the configurations of FIGS. 1-3, the process of FIG. 4 is not limited to such configurations and can be applied to other systems and configurations.

FIG. 5 illustrates an example of an output of uplift on features. As shown, an independent variable (e.g., the number of items posted) may have different impacts on independent features A, B, C, D and E. Specifically, the independent variable may have the biggest lift on the independent feature B, second biggest lift on the independent feature A, third biggest lift on the independent feature E, no impact on the independent feature C and negative impact on the independent feature D.

Figure 6:
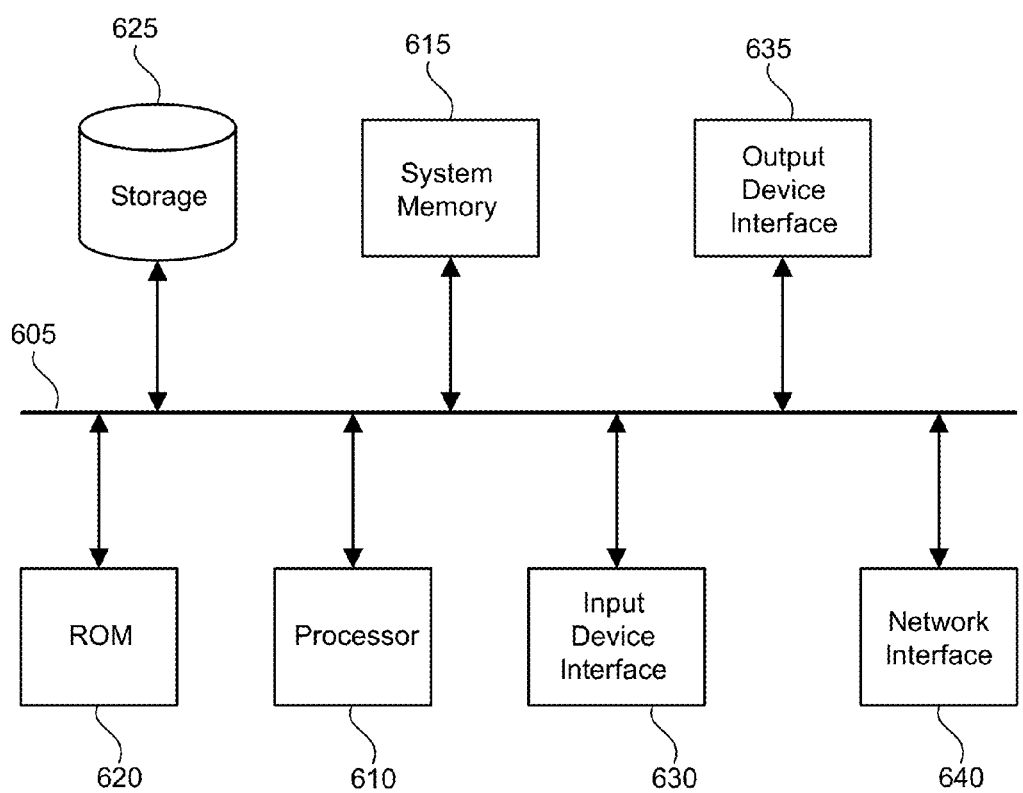
FIG. 6 conceptually illustrates an electronic system 600 with which some implementations of the subject technology are implemented.

FIG. 6 conceptually illustrates an electronic system 600 with which some implementations of the subject technology are implemented. For example, one or more of the user devices 101 and 102 and the server 104 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for providing real-time analysis of feature relationships in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method for determining a relationship between the use of features on an interactive network, the method comprising:

receiving user activity data and user status data for users in the interactive network which comprises at least two features, wherein the user status data comprises social graph information associated with the interactive network;

generating a user dataset by associating, for each user, the user's activity data with the user's status data using a unique identification of the user and a timestamp;

analyzing the user dataset using a statistical model to determine a relationship between a use of one of the features of the interactive network with a use of another of the features of the interactive network; and providing, for display, an output of the analysis by the statistical model, the output including an indicator of the relationship between the use of one of the features of the interactive network with a use of another of the features of the interactive network.

2. The method of claim 1, wherein the user activity data comprises interaction with an item on the interactive network.

3. The method of claim 1, wherein the user status data further comprise demographic information associated with the interactive network.

4. The method of claim 1, wherein the user dataset comprises a user activity metric associated with the interactive network.

5. The method of claim 4, further comprising: compiling the user activity data into the user activity metric for being analyzed by the statistical model.

6. The method of claim 1, wherein the user dataset comprises a user status metric associated with the interactive network.

7. The method of claim 6, further comprising: compiling user status data into the status metric for being analyzed by the statistical model.

8. The method of claim 1, further comprising: defining the statistical model used to analyze the user dataset.

9. The method of claim 1, wherein the statistical model comprises at least one of the linear mixed effect model or the propensity score matching model.

10. A system for determining a relationship between the use of features on an interactive network, the system comprising:

a computer configured to:

receive user activity data and user status data for users in the interactive network which comprises at least two features, wherein the user status data comprises social graph information associated with the interactive network;

define at least one user metric for turning the user activity data and user status data into at least one user metric;

generate a user dataset for each user, based on the user activity data, the user status data and the at least one user metric;

analyze the user dataset using a statistical model to determine a relationship between a use of one of the features of the interactive network with a use of another of the features of the interactive network; and provide, for display, an output of the analysis by the statistical model, the output including an indicator the relationship between the use of one of the features of the interactive network with a use of another of the features of the interactive network.

11. The system of claim 10, wherein the user activity data comprises interaction with an item on the interactive network.

12. The system of claim 10, wherein the user status data further comprise demographic information.

13. The system of claim 10, wherein the user metric comprises a user activity metric.

14. The system of claim 13, further comprising: compiling user activity data into the user activity metric for being analyzed by the statistical model.

15. The system of claim 10, wherein the user metric comprises a user status metric.

16. The system of claim 15, further comprising: compiling user status data into the status metric for being analyzed by the statistical model.

17. The method of claim 1, further comprising: defining the statistical model used to analyze the user dataset.

18. A non-transitory computer-readable medium for determining a relationship between the use of features on an interactive network, the computer-readable medium comprising instructions that, when executed by a computer, cause the computer to:

receive user activity data and user status data for users in the interactive network which comprises at least two features, wherein the user status data comprises social graph information associated with the interactive network;

generate a user dataset by associating, for each user, the user's activity data with the user's status data using a unique identification of the user and a timestamp;

analyze the user dataset using a statistical model to determine a relationship between a use of one of the features of the interactive network with a use of another of the features of the interactive network; and provide, for display, an output of analysis by the statistical model, the output including an indicator of the relationship between the use of one of the features of the interactive network with a use of another of the features of the interactive network.

\* \* \* \* \*